United States Patent
Linden et al.

(10) Patent No.: US 8,622,549 B2
(45) Date of Patent: Jan. 7, 2014

(54) BEAM COMBINER FOR A SCANNED BEAM DISPLAY

(75) Inventors: Kelly D. Linden, Lynnwood, WA (US); Joshua O. Miller, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 421 days.

(21) Appl. No.: 13/172,618

(22) Filed: Jun. 29, 2011

(65) Prior Publication Data

US 2013/0003021 A1    Jan. 3, 2013

(51) Int. Cl.
*G03B 21/14* (2006.01)

(52) U.S. Cl.
USPC .................................. 353/20; 353/94; 353/38

(58) Field of Classification Search
USPC ............ 353/20, 22, 38, 94, 121, 122; 359/17, 359/18, 201.1, 201.2, 202.1, 203.1
See application file for complete search history.

(56) References Cited

U.S. PATENT DOCUMENTS

| | | | | |
|---|---|---|---|---|
| 4,806,750 A | * | 2/1989 | Vincent | 250/226 |
| 5,999,509 A | * | 12/1999 | Sugiura et al. | 369/112.17 |
| 6,396,630 B1 | * | 5/2002 | Stiens et al. | 359/489.07 |
| 6,407,974 B1 | * | 6/2002 | Kim et al. | 369/112.29 |
| 6,487,014 B2 | * | 11/2002 | Li | 359/484.04 |
| 7,009,767 B2 | * | 3/2006 | Hoshikawa et al. | 359/484.05 |
| 7,798,648 B2 | * | 9/2010 | Ijzerman et al. | 353/7 |
| 8,147,069 B2 | * | 4/2012 | Seo et al. | 353/31 |
| 8,308,302 B2 | * | 11/2012 | Lescure et al. | 353/31 |
| 8,376,551 B2 | * | 2/2013 | Cobb | 353/81 |
| 2002/0012168 A1 | * | 1/2002 | Li | 359/487 |
| 2007/0153234 A1 | * | 7/2007 | Salters et al. | 353/8 |
| 2007/0195274 A1 | * | 8/2007 | Yamamoto | 353/20 |
| 2009/0002635 A1 | * | 1/2009 | Yamamoto | 353/20 |
| 2009/0002636 A1 | * | 1/2009 | Yamamoto | 353/20 |
| 2009/0190098 A1 | * | 7/2009 | DeJong et al. | 353/20 |
| 2010/0033685 A1 | * | 2/2010 | Seo et al. | 353/31 |
| 2010/0302513 A1 | * | 12/2010 | Takahashi et al. | 353/33 |
| 2010/0315597 A1 | * | 12/2010 | Powell et al. | 353/20 |
| 2011/0205501 A1 | * | 8/2011 | Cobb | 353/81 |
| 2011/0249240 A1 | * | 10/2011 | Takahashi et al. | 353/33 |
| 2012/0013855 A1 | * | 1/2012 | Lescure et al. | 353/81 |

* cited by examiner

*Primary Examiner* — Francis M Legasse, Jr.
*Assistant Examiner* — Bao-Luan Le
(74) *Attorney, Agent, or Firm* — Kevin D. Wills

(57) ABSTRACT

A beam combiner has a first coating on a first side capable of imparting a first polarization rotation, and a second coating on a second side capable of imparting a second polarization rotation. A first beam impinging on the first side passes through the first and second coatings as a first beam component. Second and third beams impinging on the second side partially reflect off the second coating as a second beam component, and partially transmit through the second coating to reflect off the first coating and exit through the second coating as a third beam component. The first, second and third beam components are disposed at selected positions and have respective selected polarizations as a combined beam spot. The positions and polarization of the beams components result in a projected image having increased allowable brightness and/or having reduced speckle.

14 Claims, 11 Drawing Sheets

BEAM COMBINER FOR A SCANNED BEAM DISPLAY

BACKGROUND

In scanned beam displays or the like, it is often desirable to increase the display brightness in order to project a brighter projected image for a given amount of ambient light. One way to increase the display brightness is to simply increase the power of the projector. The greater the power applied to the light source or sources that generate the scanned image, the greater the brightness in the resulting scanned image. However, governmental regulatory bodies typically place limits on the amount of power for the scanned beam for a given beam spot size. Furthermore, in scanned beam displays interference patterns from the scanned beam may result in speckle artifacts in the projected image. Although the presence of speckle in the display may be tolerable and even unnoticeable to the user, it still may be beneficial to reduce the amount of speckle in the projected image to provide an image that is more aesthetically pleasing. Thus, two overall goals for a scanned beam projector or the like may include the ability to provide a brighter projected image without exceeding regulatory limits, and also to reduce speckle in the projected image.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
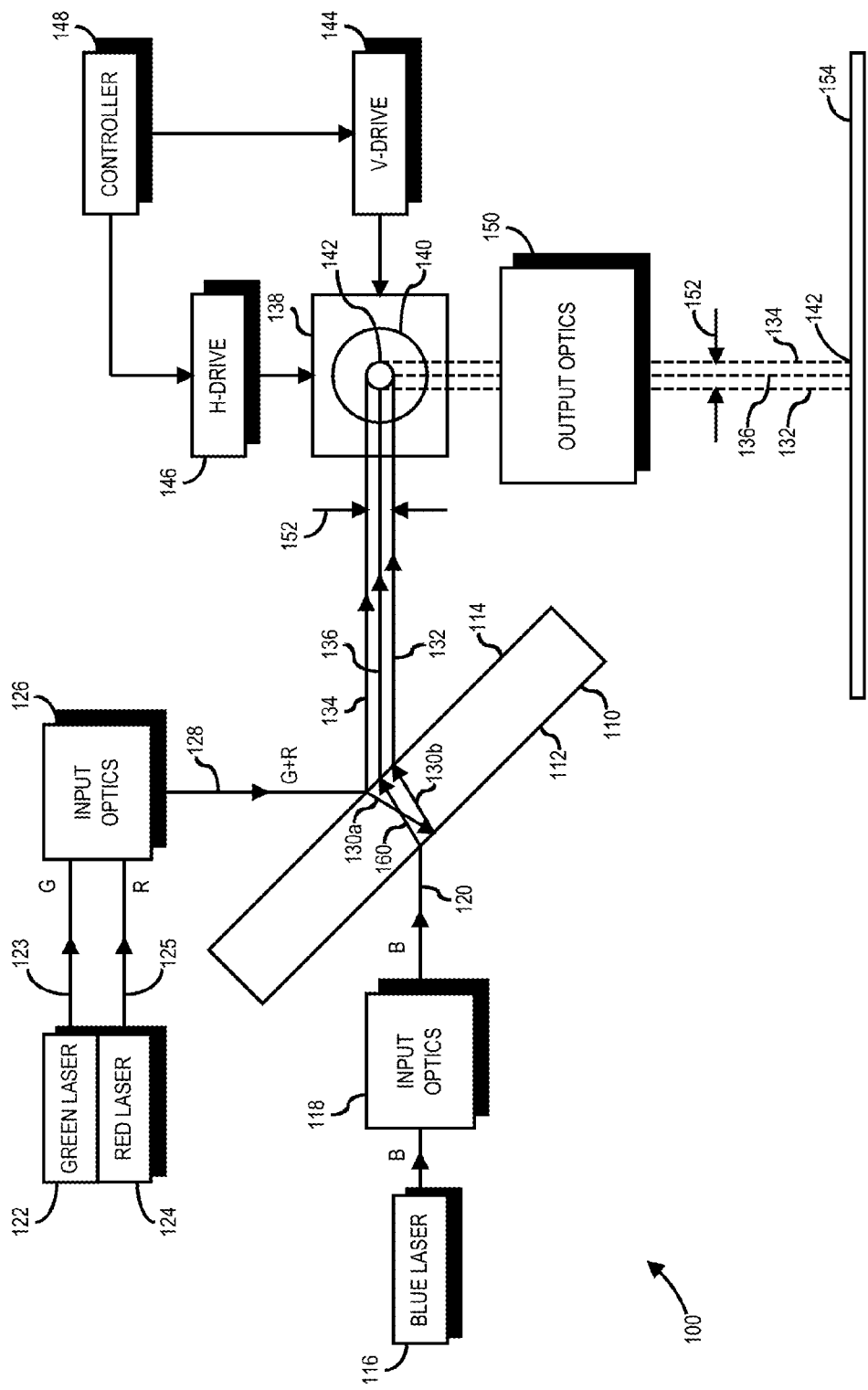
FIG. 1 is a diagram of a projector having a beam combiner in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a projector having a beam combiner in accordance with one or more embodiments will be discussed. As shown in FIG. 1, a projector 100 may include a beam combiner 110 to combine the output beams from one or more light sources such as a blue laser 116, a green laser 122, and a red laser 124 to generate a red-green-blue (RGB) color image. Although projector 100 will be discussed for purposes of example having three color lasers, projector 100 may have more or fewer color light sources with visible or invisible wavelengths, which may be lasers or other types of light sources such as light emitting diodes (LEDs), and the scope of the claimed subject matter is not limited in these respects.

As shown in FIG. 1, blue laser 116 may emit a blue beam (B) 120 that may be passed through input optics 118 which may comprise a collimating lens, a top hat lens, and so on, to provide desired shaping of the beam profile. Likewise, green laser 122 and red laser 124 may emit a green beam (G) 123 and a red beam (R) 125, respectively, that may pass through input optics 126 which may be the same or similar to the input optics 118 for blue laser 116. Furthermore, input optics 126 may comprise a beam combiner to combine the green beam 123 and the red beam 125 into a combined beam (G+R) 128. As will be discussed in further detail with respect to FIG. 2, below, beam combiner 110 combines the blue beam 120 with the combined beam 128 such that three total output beams or beam groups, beam 132, beam 134, and beam 136, may generate a spot 142 on a mirror 142 of an imaging platform 138. The blue beam 120 enters beam combiner 110 from side 110 and exits out the other side 114 of beam combiner 110 as beam 136. When combined beam 128 impinges on side 114 of beam combiner 110, a portion of the combined beam 128 is reflected as combined beam 134. Another portion of combined beam 128 enters into beam combiner as beam 130*a* and is reflected off of side 112 as beam 130*b* to exit beam combiner 110 as beam 132. Blue beam 136 is generally located in between the two resulting combined output beams, beam 132 and beam 134, which are separated by a separation distance 152 to form the beam spot 142 on mirror 140 of imaging platform 138. It should be noted that blue beam 136 may be disposed at any location between beam 132 and beam 134 such as in the center between the two other beams but also at other non-central positions, and the scope of the claimed subject matter is not limited in this respect.

As will be discussed in more detail with respect to FIG. 7, below, controller 148 controls a vertical drive circuit 144 and a horizontal drive circuit 144 to cause imaging platform 138 to scan the reflection of the spot 142 as a scanned output beam. Although such an arrangement of imaging platform 138 comprises a two-dimensional scanner, other types of scanners may likewise be utilized, for example a one-dimensional scanner or two one-dimensional scanners to create a two-dimensional image, and the scope of the claimed subject matter is not limited in these respects. In one or more embodiments, imaging platform 138 may comprise a microelectromechanical system (MEMS) device fabricated from silicon or the like, however the scope of the claimed subject matter is not limited in this respect. When the projector 100 is provided as an integrated package or unit, projector 100 may be referred to as a photonics module or integrated photonics module.

The output beam scanned by imaging platform 138 may comprise the reflection of spot 142 as an output beam scanned onto a display surface 154 wherein the scanned beam comprises the individual beams, beam 132, beam 134, and beam 136 wherein beam 136 is generally between beams 132 and 134, and wherein beams 132 and 134 have are separated by separation distance 152 or offset. In one or more embodiments, the output beam optionally may pass through output optics 150 to control and/or shape the resulting projected image and may include, for example, one or more mirrors, total internal reflection (TIR) surfaces, prisms, wedges, and/or lenses, and the scope of the claimed subject matter is not limited in this respect. The scanning of the output beam generated on a projection surface 154 results in a projected image.

As will be discussed in further detail, below, beam combiner 110 provides a desired separation distance or offset of beams 132 and 134, and further provides a desired polarity in the beams to affect the image displayed by projector 100, for example to increase an allowable amount of brightness and contrast in the displayed image, and to reduce speckle artifacts in the displayed image. Details of the operation of beam combiner 110 to achieve such results are discussed with respect to FIG. 2, below.

Figure 2:
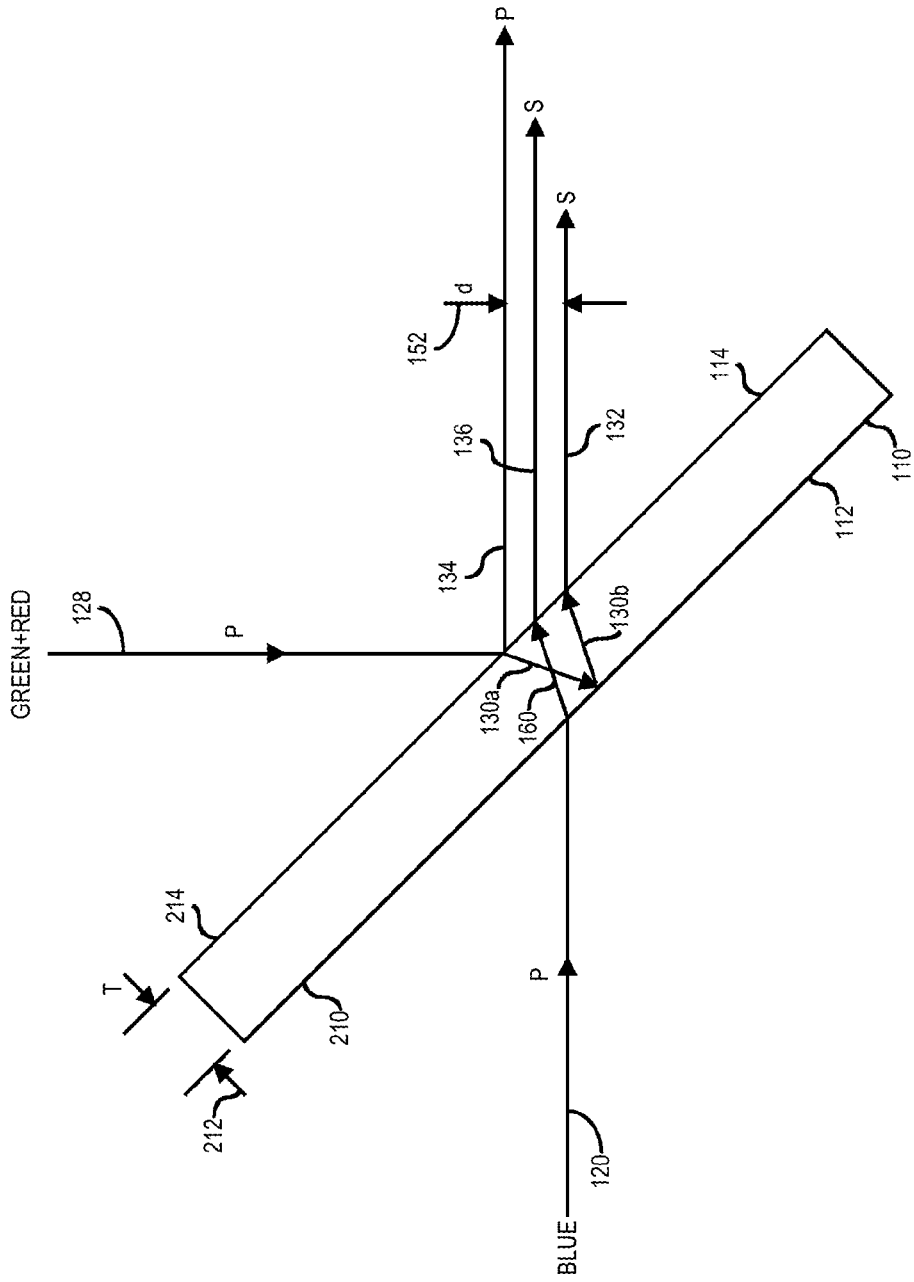
FIG. 2 is a diagram of the beam combiner of FIG. 1 showing the combining of multiple beams with a desired beam separation and polarization in accordance with one or more embodiments.

Referring now to FIG. 2, a diagram of the beam combiner of FIG. 1 showing the combining of multiple beams with a desired beam separation and polarization in accordance with one or more embodiments will be discussed. FIG. 2 shows the details of operation of the beam combiner 110 in a display such as scanned beam display of FIG. 1, wherein the beam combiner 110 combines a blue beam 120 with a combined green and read beam 128. Blue beam 120 is projected onto side 112 of beam combiner 110 wherein side 112 has a coating 210 disposed thereon that is essentially transmissive to the blue beam 120 so that the blue beam 120 passes through beam combiner 110 as beam 160 and exits side 114 of beam combiner 110 as blue beam 136 with an expected offset from blue beam 120 due to the difference between the index of refraction of beam combiner and the index of refraction of air via the operation of Snell's law. Furthermore, coating 210 on surface 112 of beam combiner 110 may comprise a polarization rotator or retarder which rotates beam 120 by one-quarter wavelength such that if beam 210 is P polarized then internal beam 160 is circularly polarized. Beam 160 then exits surface 114 which likewise may have a coating 214 that may comprise a polarization rotator or retarder which rotates beam 160 by another one-quarter wavelength such that blue beam 136 is S polarized when it exits beam combiner 110. Alternatively, polarization rotation may be achieved on one or both sides of beam combiner 110 via an internal coating, structure, or material built in or fabricated within the interior of beam combiner. Similarly, the combined green and red beam 128 may be P polarized and projected onto side 114 of beam combiner such that a portion of the combined beam 128 is reflected as combined beam 134, and another portion passes through side 114 as combined beam 130*a* with an expected refraction and circular polarization via coating 214. The coating 210 on side 112 is selected to be reflective for the combined beam 130*a* which is rotated in polarization such that the reflected combined beam 130*a* exits side 114 of beam combiner 110 as combined beam 132 with S polarization. Due to refraction of combined beam 128 as it passes through beam combiner as beam 130*a* and beam 130*b*, beam 132 is emitted from side 114 at a separation distance (d) 152 from beam 134. The amount separation distance 152 is a function of the thickness (T) 212 of beam combiner 110 and the index of refraction of beam combiner 110. The thickness 212 and the index of refraction of beam combiner 110 are selected to result in a desired separation distance 152 between beam 132 and beam 134. Since beam 134 is a first, reflected version of combined beam 128, beam 134 may be referred to as a primary beam, and beam 132 may be referred to as a secondary beam. Optionally, side 114 may include an additional coating to help select the polarization of combined beam 134, although the scope of the claimed subject matter is not limited in this respect.

Furthermore, beam combiner 110 operates to provide a desired polarization of the output beams. The combined beam 128 may have a random polarization, circular polarization, or linear polarization, and the beam combiner 110 operates to impart polarization diversity to the primary and secondary beams. In the example shown, the primary beam, beam 134, has a first polarization, P polarization in this example, and the secondary beam, beam 132, has a second polarization, S polarization in this example, that is orthogonal to the polarization of the primary beam. The blue beam 136 is selected to have a polarization that results in a desired output polarization, S polarization in this example, of the secondary beam, beam 132. As a result of such beam combing by beam combiner 110, in one or more embodiments the resulting spot 142 is generated on imaging platform 138 from three component beams or beam groups, a first combined green and red beam 134 having P polarization, a second combined green and red beam 132 having S polarization, and a blue beam 136 also having S polarization, wherein the first combined green and red beam 134 and the second combined green and red beam 132 are separated by a separation distance 152. The separation of the primary and secondary combined green and red beams results in an increase in the C6 constant which results in a brighter allowable display. The C6 constant is a scale factor defined by the International Electromechanical Commission (IEC) and refers to the ration of the angles of the actual beam versus the diffraction limited beam based on the limit of the human eye. The angles are calculated by calculating the angle between the 1/e value of a Gaussian beam over the minimum focus of the human eye, which is about 100 millimeters (mm). If the beam or beams that produce the spot 142 on the imaging platform 138 result in a tighter, non-diffracted spot 142, the C6 value of the beam is at or near C6=1. By changing the spot 146 to be less tight and more diffracted via some separation of the beams, the C6 value may be increased which results in a brighter allowable displayed image. In one or more embodiments, the amount of separation distance 152 between the primary and secondary combined beams, beam 132 and beam 134, results in an increase in the C6 value of approximately 40% to about 50% compared to unseparated beams, and in some embodiments the C6 value may be approximately doubled compared to unseparated beams, although the scope of the claimed subject matter is not limited in this respect. Furthermore, in one or more embodiments, the resulting polarization diversity of the combined beams 132 and 134 via operation of beam combiner 110 operates to reduce speckle artifacts in the resulting projected image wherein that interference between beams 132 and 134 is reduced due to the beams having orthogonal, or nearly orthogonal, polarizations which reduces speckle in the image.

Although FIG. 1 and FIG. 2 illustrate one example arrangement of the blue, green, and red beams, and the resulting polarizations of the beams as a result of the operation of beam combiner 110, it should be noted that other combinations of the beam colors may be provided, and/or other polarizations may be provided, without departing from the scope of the claimed subject matter and without substantial change to the operation of projector 100 or beam combiner 110, or the resulting allowable brightness or speckle in the projected image. For example, the position of blue laser 116 may be interchanged with either one of green laser 122 or red laser 124. Furthermore, although the primary combined beam 134 may have P polarization and the secondary combined beam may have S polarization, these polarizations may be interchanged in one or more alternative embodiments. In general, green laser 122 is combined with red laser 124 and which are in turn separated into a primary beam having a first polarization and a secondary beam having a second polarization orthogonal to the first polarization, at a selected separation distance since the red and green beams have more impact on the C6 value than the blue beam, and further the red and green beams have more impact on speckle than the blue beam. Additionally, the polarization of the blue beam 136 is selected to be the same polarization as the secondary beam 132, although the scope of the claimed subject matter is not limited in these respects. Furthermore, although FIG. 1 and FIG. 2 illustrate a beam combiner 110 to achieve the results of a brighter allowable displayed image and speckle reduction in the displayed image via operation of the beam combiner 110, alternatively a fold mirror may be utilized to achieve such results as shown in and described with respect to FIG. 3, below.

Figure 3:
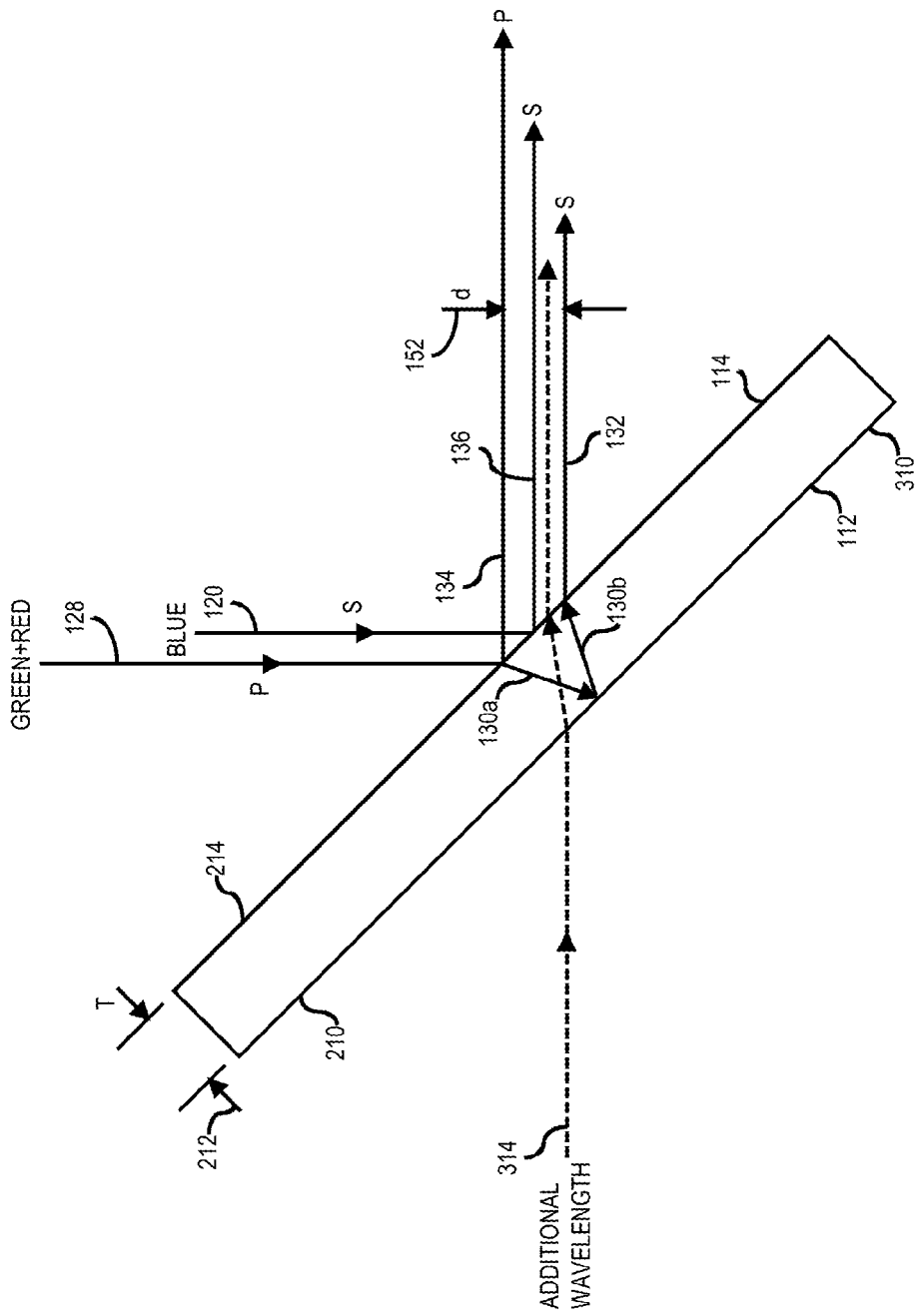
FIG. 3 is an a diagram of a fold mirror as an alternative to the beam combiner of FIG. 2 in accordance with one or more embodiments.

Referring now to FIG. 3, a diagram of a fold mirror as an alternative to the beam combiner of FIG. 2 in accordance with one or more embodiments will be discussed. As shown in FIG. 3, a fold mirror 310 may be utilized in lieu of the beam combiner 110 shown in and described with respect to FIG. 1 and FIG. 2. The fold mirror 310 operates in essentially the same manner as beam combiner 110 except that the blue beam 120 may be directed toward fold mirror 310 from the same side 114 that combined green and red beam 128 are directed toward fold mirror 310. In some embodiments, side 114 may have a coating 214 that is reflective of blue beam 120 such that blue beam 120 reflects off of side 113 of fold mirror 310 as beam 136. Alternatively, via appropriate selection of the coating 210 and positioning of the point of incidence of the blue beam 120, the blue beam could instead enter into fold mirror 310 and be reflected off of side 112 to exit fold mirror 310 as blue beam 136. The polarization of the incoming blue beam 120 may be selected so that the output blue beam 136 may have the desired resulting polarization that matches that of the secondary combined beam 132, S polarization in this example. Furthermore, alternative arrangements and alternative structures for fold mirror 310 may likewise be provided to result in the desired separation of the combined green and red beams 132 and 134, and with the desired polarizations, and the scope of the claimed subject matter is not limited in these respects. In one or more embodiments, one or more additional beams 314 may be applied to surface 112 in a manner substantially similar to blue beam 120 as shown in and described with respect to FIG. 2 such that fold mirror 310 provides a beam combiner function to combine the one or more additional beams 314 with the blue, green, and red beams. In such embodiments, the one or more additional beams 314 may comprise beams having one or more additional wavelengths different than blue, red, or green, and may be visible wavelength beams or invisible wavelength beams such as infrared or ultraviolet. In some embodiments, the polarization of such one or more additional beams may be selected to combine with beam 132, beam 134 and beam 136, for example to provide a three-dimensional projected image when viewed by the user, with or without polarized glasses for viewing a three-dimensional image. However, this is merely one example application for the one or more additional beams, and the scope of the claimed subject matter is not limited in this respect.

Figure 4A:
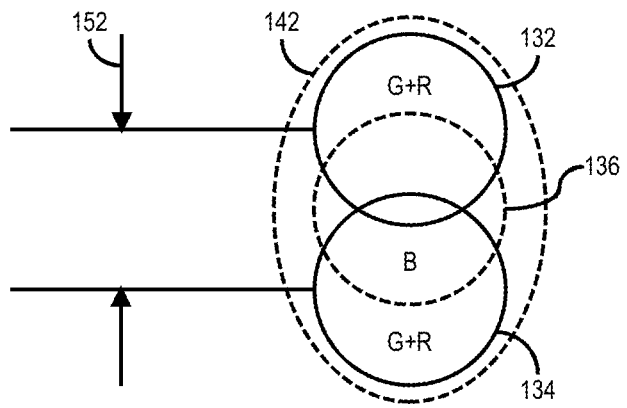
FIGS. 4A and 4B are diagrams of the beam separation and polarization achieved with the beam combiner of FIG. 2 in accordance with one or more embodiments.
Figure 4B:
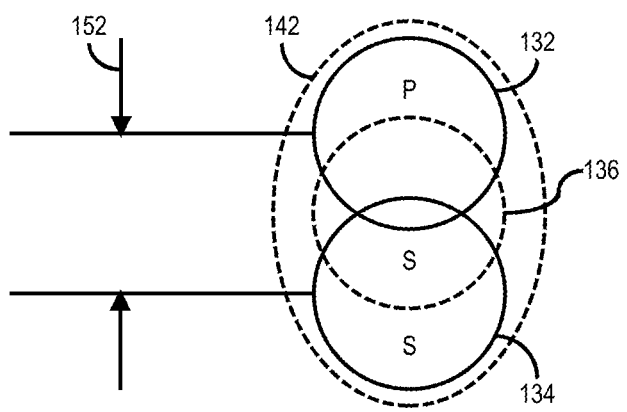

Referring now to FIGS. 4A and 4B, diagrams of the beam separation and polarization achieved with the beam combiner of FIG. 2 in accordance with one or more embodiments will be discussed. As shown in FIG. 4A, the spot 142 impinging on mirror 140 of imaging platform 138 may comprise three spot components from the corresponding combined green and red beam 132, combined green and red beam 134, and blue beam 136. The operation of beam combiner 110 or fold mirror 310 results in the two combined green and red beams to be separated by separation distance 152 or offset as discussed herein, above. The separation of the combined green and red beams results in the resulting spot 142 being less tight, that is not as concentrated in a smaller sized area, and more diffused, which results in a higher C6 value and therefore a brighter displayed image. As shown in FIG. 4B, the beams generating the three spot components have the indicated polarization wherein the first combined green and red beam 132 has a first polarization (P polarization) that is orthogonal, or nearly orthogonal, to the polarization (S polarization) of the second combined green and red beam 134 and the blue beam 136. Such polarization diversity of the separated beams results in speckle reduction in the displayed image. The amount of increase in brightness and/or the reduction in speckle may be controlled by the amount of separation distance 152 or offset achieved between combined beam 132 and combined beam 134. A greater amount of separation distance may result in a greater amount of increase in allowable brightness and speckle reduction. Since the separation of the beams also results in a generally larger size of spot 142, which may result in lower resolution in the displayed image, the amount of allowable brightness and speckle reduction may be balanced against any decrease in resolution by varying the separation distance 152 to a desired or selected value accordingly, for example according to the application for which the projector 100 is intended. The desired separation distance 152 may be selected via selecting an appropriate thickness 212 and/or index of refraction of the beam combiner 110 or fold mirror 310. It should be noted that blue beam 136 and its resulting spot may be disposed at any location between beam 132 and beam 134 and their respective spots such as in the center between the two other beams and spots but also at other non-central positions, and the scope of the claimed subject matter is not limited in this respect.

Figure 5A:
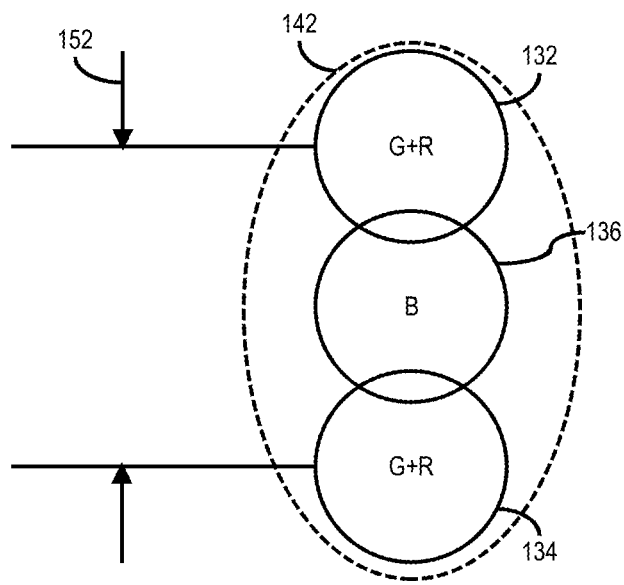
FIGS. 5A and 5B are diagrams of the beam separation and polarization achieved with the beam combiner of FIG. 2 wherein a thicker beam combiner results in greater beam separation in accordance with one or more embodiments.
Figure 5B:
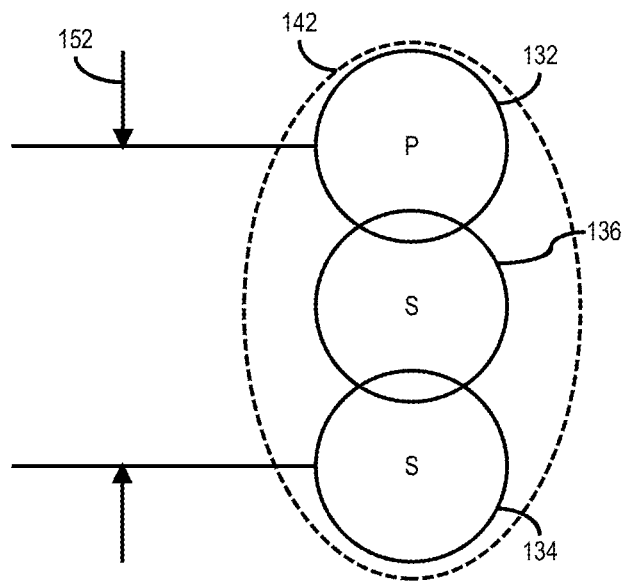

Referring now to FIGS. 5A and 5B, diagrams of the beam separation and polarization achieved with the beam combiner of FIG. 2 wherein a thicker beam combiner results in greater beam separation in accordance with one or more embodiments will be discussed. FIGS. 5A and 5B are substantially similar to FIGS. 5A and 5B, respectively, except that the separation distance 152 between the spot components from combined beam 132 and combined beam 134 is greater in FIG. 5A and FIG. 5B than the separation distance 152 or offset shown in FIG. 4A and FIG. 4B. The increased separation distance 152 or offset may be achieved via a thicker beam combiner 110 or fold mirror 310, and/or by increasing the index of refraction of the beam combiner 100 or fold mirror 310. It should be noted that blue beam 136 and its resulting spot may be disposed at any location between beam 132 and beam 134 and their respective spots such as in the center between the two other beams and spots but also at other non-central positions, and the scope of the claimed subject matter is not limited in this respect.

Figure 6:
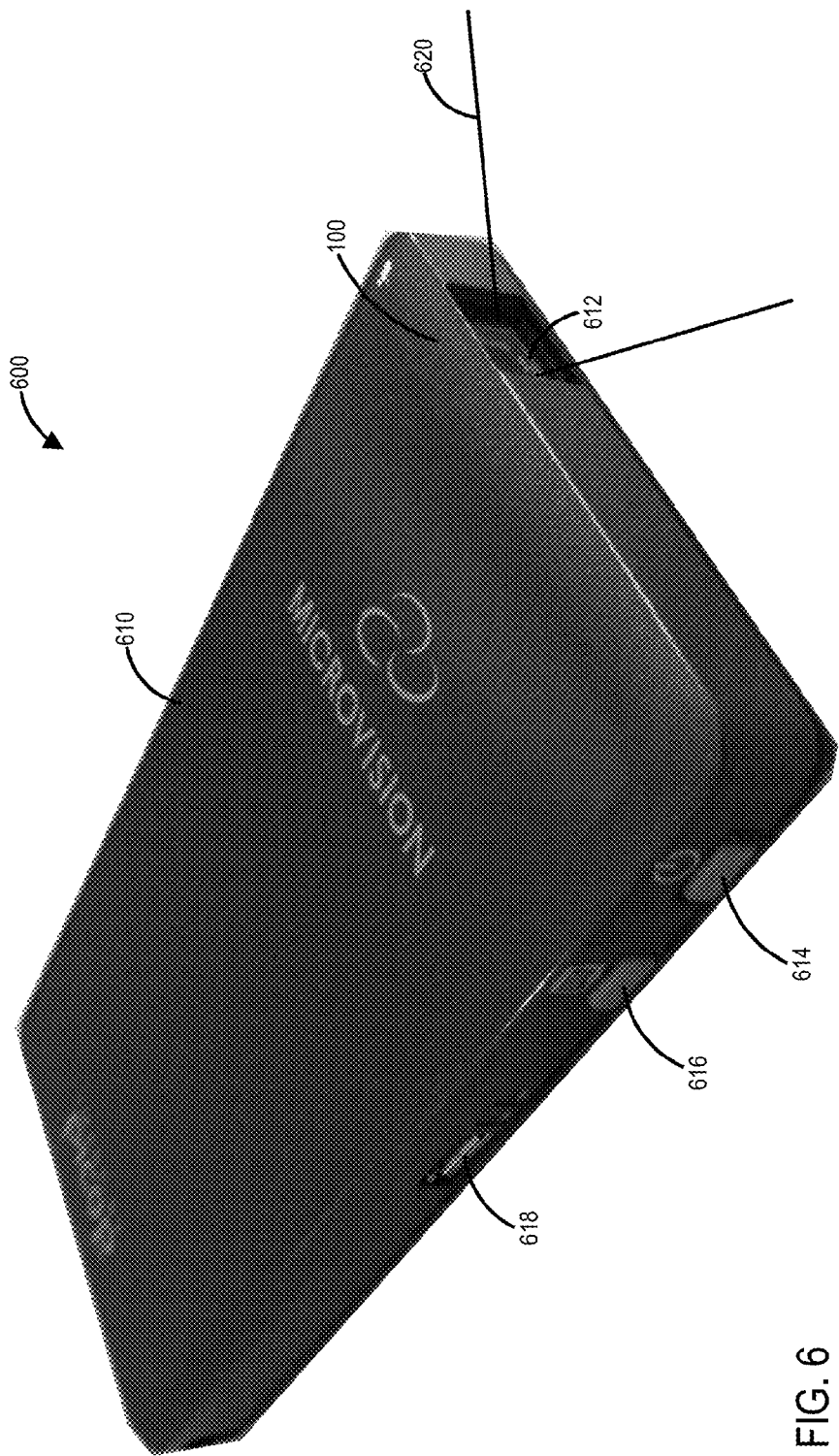
FIG. 6 is an isometric view of a projector having a beam combiner FIG. 2 in accordance with one or more embodiments.

Referring now to FIG. 6, an isometric view of a projector having the beam combiner FIG. 2 in accordance with one or more embodiments will be discussed. The projector 600 of FIG. 6 represents one example application of projector 100 having a beam combiner 110 as discussed herein. Projector 600 may comprise a housing 610 housing projector 100 including beam combiner 110 among other components such as a battery, input/output circuits, and so on. The housing 610 may include a power button 614 and a menu button 616, and may include an input/output (I/O) port 618 for providing a video signal to be displayed to projector 600, which optionally may also include a power line for powering the projector 600 and/or for charging the battery. An example of such a projector is a SHOWWX+PICOP projector available from Microvision, Inc. of Redmond, Wash., USA.

Figure 7:
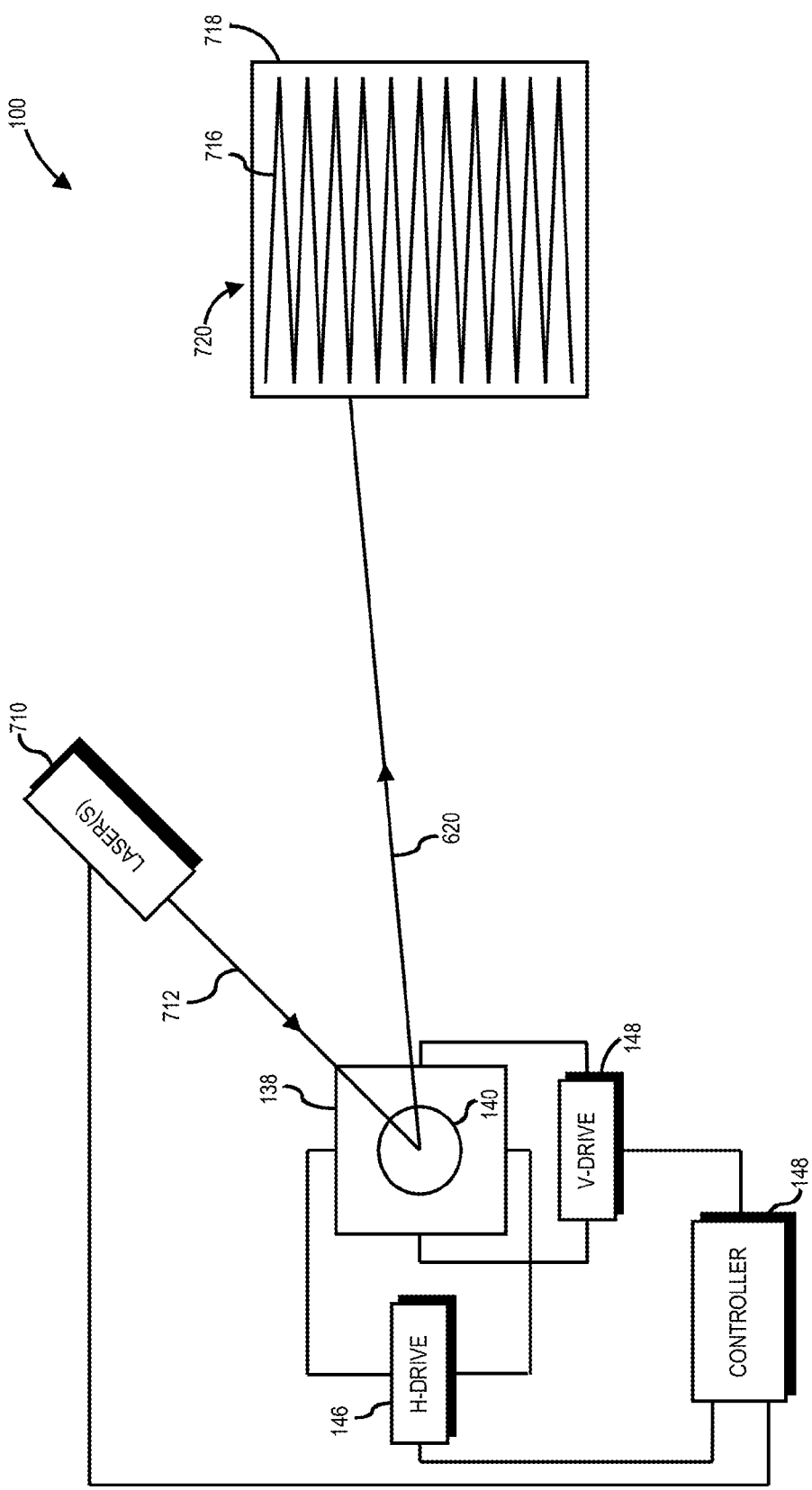
FIG. 7 is a diagram of the projector of FIG. 1 illustrating the projection of an image via the scanning of one or more beams in accordance with one or more embodiments.

Referring now to FIG. 7, a diagram of the projector of FIG. 1 illustrating the projection of an image via the scanning of one or more beams in accordance with one or more embodiments will be discussed. Although FIG. 7 illustrates one type of a scanned beam display system for purposes of discussion, for example a microelectromechanical system (MEMS) based display, it should be noted that other types of scanning displays including those that use two uniaxial scanners, rotating polygon scanners, or galvonometric scanners as well as systems that use the combination of a one-dimensional spatial light modulator with a single axis scanner as some of many examples, may also utilize the claimed subject matter and the scope of the claimed subject matter is not limited in this respect. Furthermore, projectors that are not scanned beam projectors but rather have two-dimensional modulators that introduce the image information in either the image plane or Fourier plane and which introduce color information time sequentially or using a filter mask on the modulator as some of many examples, may also utilize the claimed subject matter and the scope of the claimed subject matter is not limited in this respect. In one or more embodiments, imaging platform 138 may comprise a digital light projector (DLP) or similar device, and the scope of the claimed subject matter is not limited in this respect.

As shown in FIG. 7, projector 100 comprises a light source 710, which may be a laser light source such as a laser or the like, capable of emitting a beam 712 which may comprise a laser beam. In some embodiments, light source 710 may comprise two or more light sources, such as in a color system having red, green, and blue light sources, wherein the beams from the light sources may be combined into a single beam. In one or more embodiments, light source 710 may include a first full color light source such as a red, green, and blue light source, and in addition may include a fourth light source to emit an invisible beam such as an ultraviolet beam or an infrared beam. The beam 712 is incident on an imaging platform 138 which may comprise a microelectromechanical system (MEMS) based scanner or the like in one or more embodiments, and reflects off of scanning mirror 140 to generate a controlled scanned output beam 620. In one or more alternative embodiments, imaging platform 138 may comprise a diffractive optic grating, a moving optic grating, a light valve, a rotating mirror, a spinning silicon device, a digital light projector device, a flying spot projector, or a liquid-crystal on silicon device, digital light projector, or other similar scanning, switching or modulating devices. A horizontal drive circuit 146 and/or a vertical drive circuit 148 modulate the direction in which scanning mirror 140 is deflected to cause output beam 620 to generate a raster scan 716, thereby creating a displayed image 720, for example on a display screen and/or image plane 718. A display controller 148 controls horizontal drive circuit 146 and vertical drive circuit 148 by converting pixel information of the displayed image into laser modulation synchronous to the imaging platform 138 to write the image information as a displayed image 720 based upon the position of the output beam 620 in raster pattern 716 and the corresponding intensity and/or color information at the corresponding pixel in the image 720. Display controller 148 may also control other various functions of projector 100.

In one or more embodiments, for two dimensional scanning to generate a two dimensional image 720, a horizontal axis may refer to the horizontal direction of raster scan 716 and the vertical axis may refer to the vertical direction of raster scan 716. Scanning mirror 140 may sweep the output beam 620 horizontally at a relatively higher frequency and also vertically at a relatively lower frequency. The result is a scanned trajectory of output beam 620 to result in raster scan 716. The fast and slow axes may also be interchanged such that the fast scan is in the vertical direction and the slow scan is in the horizontal direction. However, the scope of the claimed subject matter is not limited in these respects.

Figure 8:
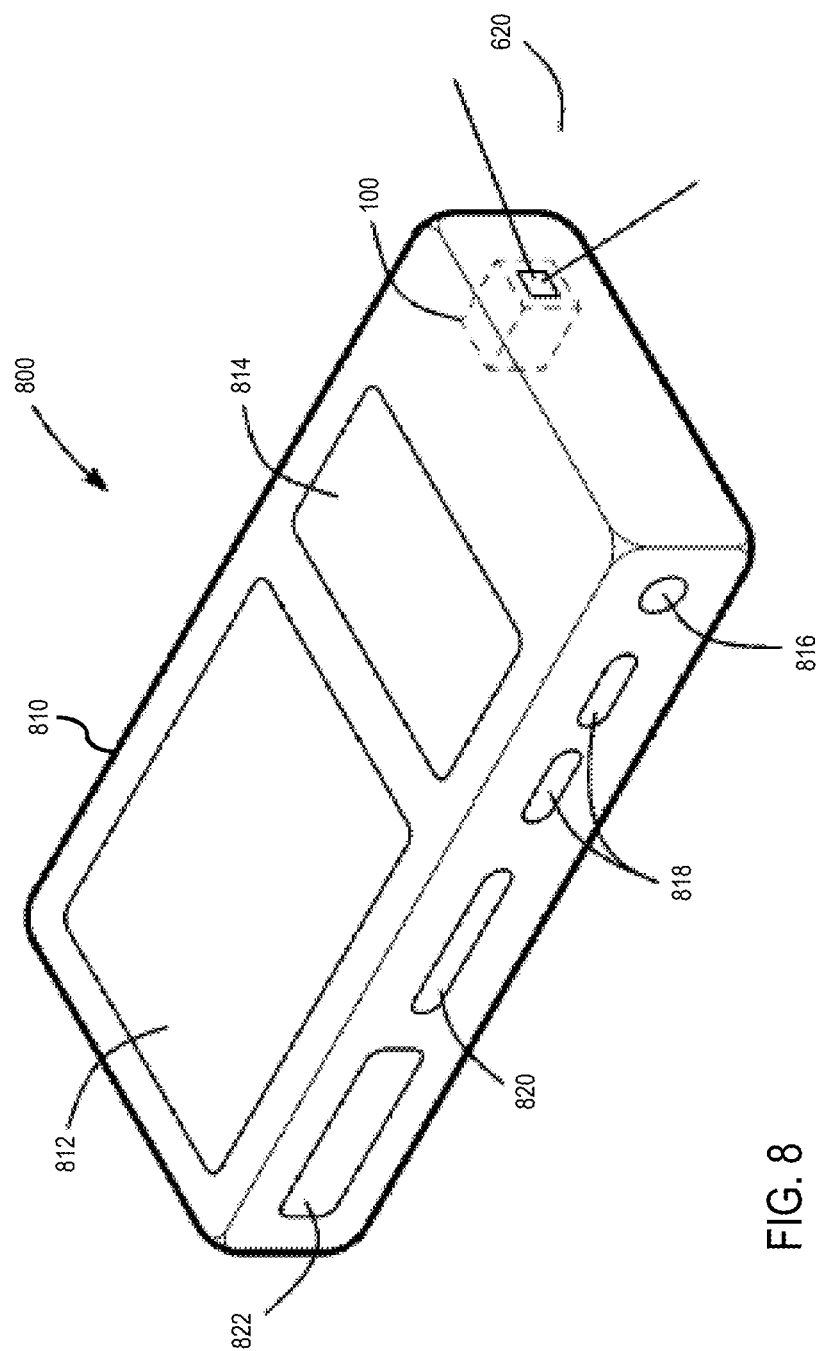
FIG. 8 is an isometric view of an information handling system having a projector with the beam combiner of FIG. 2 in accordance with one or more embodiments.

Referring now to FIG. 8, an isometric view of an information handling system having a projector with the beam combiner of FIG. 2 in accordance with one or more embodiments will be discussed. As shown in FIG. 8, information handling system 800 may comprise any of several types of computing platforms, including cell phones, personal digital assistants (PDAs), netbooks, notebook computers, internet browsing devices, tablets, pads, and so on, and the scope of the claimed subject matter is not limited in this respects. In the example shown in FIG. 8, information handling system 800 may comprise a housing 810 to house projector 100 having a beam combiner 110 or fold mirror 310 as discussed herein to provide a scanned output beam 620 to project an image. Information handling system 800 optionally may include a display 812, keyboard 814 or other control buttons or actuators, a speaker or headphone jack 816 with optional microphone input, control buttons 818, memory card slot 820, and/or input/output (I/O) port 822, or combinations thereof. Furthermore, information handling system 800 may have other form factors and fewer or greater features than shown, and the scope of the claimed subject matter is not limited in these respects.

Figure 9:
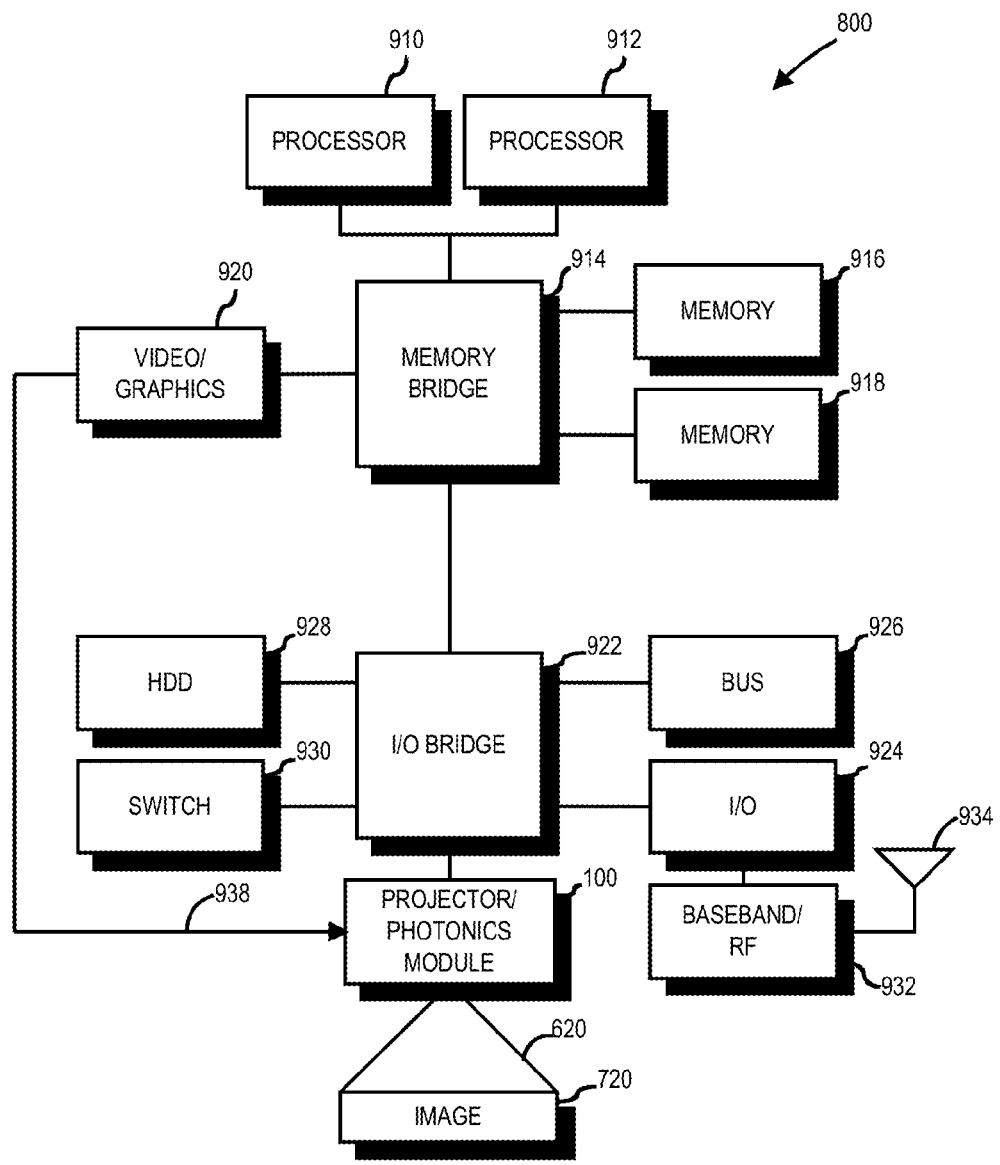
FIG. 9 is a block diagram of an example architecture of an the information handling system of FIG. 8 in accordance with one or more embodiments.

Referring now to FIG. 9, a block diagram of an example architecture of the information handling system of FIG. 8 in accordance with one or more embodiments will be discussed. Although FIG. 9 shows one example architecture of the information handling system 800 of FIG. 8, information handling system 800 may include more or fewer elements and/or different arrangements of the elements than shown in FIG. 9, and the scope of the claimed subject matter is not limited in these respects. Information handling system 800 may comprise one or more processors such as processor 910 and/or processor 912, which may comprise one or more processing cores in some embodiments. One or more of processor 910 and/or processor 912 may couple to one or more memories 916 and/or 918 via memory bridge 914, which may be disposed external to processors 910 and/or 912, or alternatively at least partially disposed within one or more of processors 910 and/or 912. Memory 916 and/or memory 918 may comprise various types of semiconductor based memory, for example volatile type memory and/or non-volatile type memory. Memory bridge 914 may couple to a video/graphics system 920 to drive a projector 100 which may comprise a photonics module, coupled to information handling system 800. The photonics module may comprise the projector 100 of FIG. 1 and/or FIG. 7 including beam combiner 110 or fold mirror 310. In one or more embodiments, video/graphics system 920 may couple to one or more of processors 910 and/or 12 and may be disposed on the same substrate or die as processor 910 and/or 912, although the scope of the claimed subject matter is not limited in this respect.

Information handling system 800 may further comprise input/output (I/O) bridge 922 to couple to various types of I/O systems. I/O system 924 may comprise, for example, a universal serial bus (USB) type system, an IEEE 1394 type system, or the like, to couple one or more peripheral devices to information handling system 900. Bus system 926 may comprise one or more bus systems such as a peripheral component interconnect (PCI) express type bus or the like, to connect one or more peripheral devices to information handling system 800. A hard disk drive (HDD) controller system 928 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 930 may be utilized to couple one or more switched devices to I/O bridge 922, for example Gigabit Ethernet type devices or the like. Furthermore, as shown in FIG. 9, information handling system 800 may include a baseband and radio-frequency (RF) block 832 comprising a base band processor and/or RF circuits and devices for wireless communication with other wireless communication devices and/or via wireless networks via antenna 934, although the scope of the claimed subject matter is not limited in these respects.

In one or more embodiments, information handling system 800 may include a photonics module which may include any one or more or all of the components of projector 100 of FIG. 1 and/or FIG. 7 such as beam combiner 110 or fold mirror 310, controller 148, horizontal drive circuit 146, vertical drive circuit 148, and/or light source 710 such as blue laser 116, green laser 122, and/or red laser 124. In one or more embodiments, the photonics module may be controlled by one or more of processors 910 and/or 912 to implements some or all of the functions of controller 148 of FIG. 1 or FIG. 7. In one or more embodiments, the photonics module provides a scanned output beam 620 to project an image 720. The embodiments discussed herein are merely example implementations of information handling system 800, and the scope of the claimed subject matter is not limited in these respects.

Figure 10:
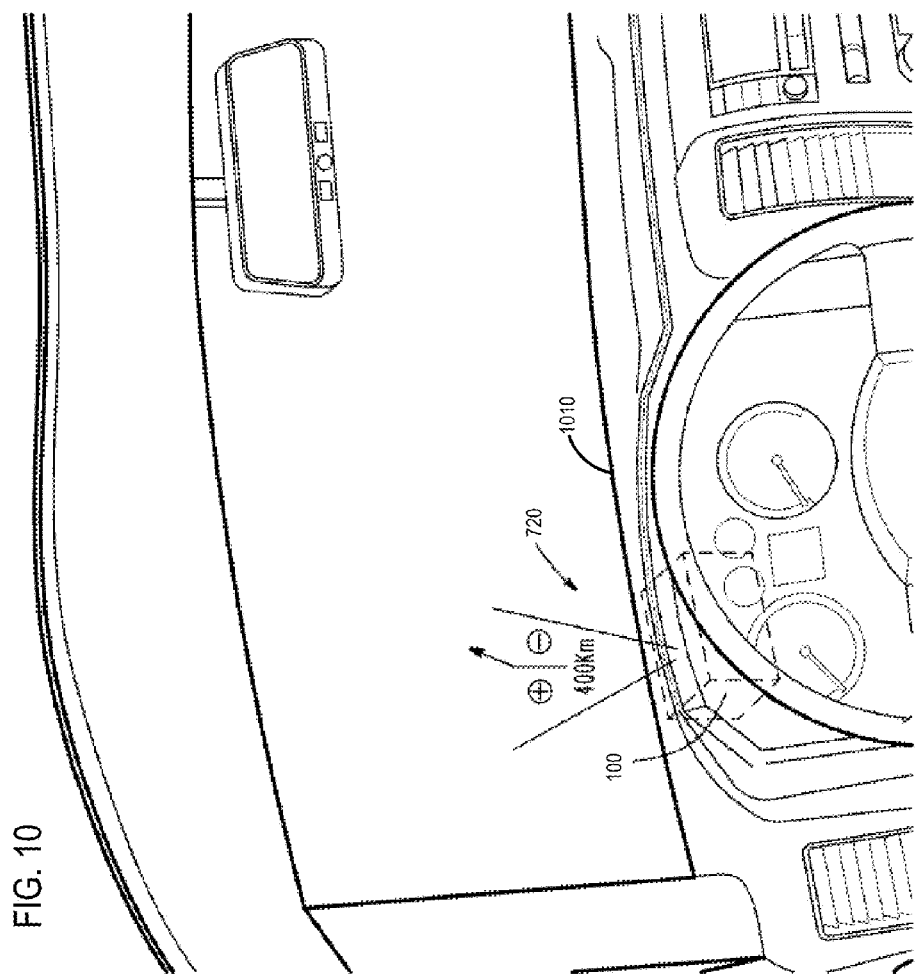
FIG. 10 is a diagram of a dash of a vehicle including the projector of FIG. 1 having the beam combiner of FIG. 2 deployed as a head-up display in accordance with one or more embodiments.

Referring now to FIG. 10, a diagram of a dash of a vehicle including the projector of FIG. 1 having the beam combiner of FIG. 2 deployed as a head-up display in accordance with one or more embodiments will be discussed. Projector 100 is shown mounted in a vehicle dash 1010 to project the head-up display image 720. Although an automotive head-up display is shown in FIG. 10, the scope of the claimed subject matter is not limited in this respect. For example, various embodiments may include head-up displays in avionics applications, air traffic control applications, and other applications. In some embodiments, although a head-up display deployed in an automobile may not experience speckle artifacts, projector 100 may still take advantage of the speckle reduction achieved herein since the projector 100 may be optionally removable from the dash 1010 of the vehicle to be used external to the vehicle. Alternatively, the image 720 may be optionally redirected to a direct viewing display surface (not shown) for use by a passenger. During such alternative or external vehicle use, projector 100 may take advantage of the speckle reduction features discussed herein, and the scope of the claimed subject matter is not limited in these respects.

Figure 11:
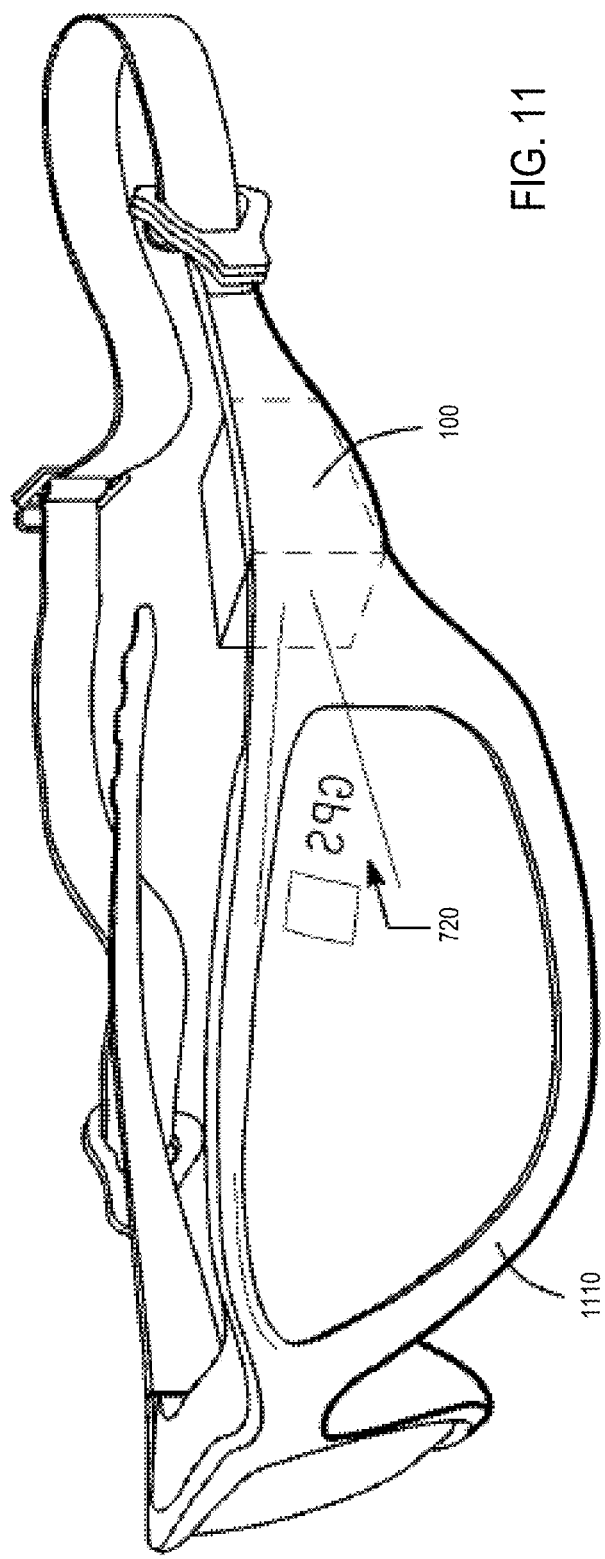
FIG. 11 is a diagram of eyewear including the projector of FIG. 1 having the beam combiner of FIG. 2 deployed as a head worn head-up display in accordance with one or more embodiments.

Referring now to FIG. 11, a diagram of eyewear including the projector of FIG. 1 having the beam combiner of FIG. 2 deployed as a head worn head-up display in accordance with one or more embodiments will be discussed. Eyewear 1110 includes projector 100 to project a displayed image 720 in the eyewear's field of view. In some embodiments, eyewear 1110 comprises see-through lenses and in other embodiments, eyewear 1110 comprises opaque lenses. For example, eyewear 1110 may be utilized in an augmented reality application wherein a wearer can see the displayed image 720 from projector 100 overlaid on the view of the physical world. Furthermore, eyewear 1110 may be utilized in a virtual reality application wherein a wearer's entire view comprises the displayed image 720 generated by projector 100. Although only one projector 100 is shown in FIG. 11, the scope of the claimed subject matter is not limited in this respect. For example, in some embodiments eyewear 1110 may include two projectors, one projector for each eye. In some embodiments, an eyewear display may not experience speckle artifacts, projector 100 may still take advantage of the speckle reduction achieved herein since the projector 100 may be optionally removable from eyewear 1110 of the vehicle to be used external to the eyewear 1110. Alternatively, the image 720 may be optionally rotated and/or redirected, or the lens of the eyewear 1110 may be optionally removed to a direct viewing display surface (not shown) for viewing by other viewers besides the wearer of eyewear 1110. During such alternative or external eyewear use, projector 100 may take advantage of the speckle reduction features discussed herein, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a beam combiner for scanned beam display and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A projector, comprising:
   first, second, and third light sources to emit beams having first, second, and third wavelengths, respectively;
   an imaging platform to control the first, second, and third beams to generate a projected image on a projection surface; and
   an optical device disposed between the first, second, and third light sources and the imaging platform, wherein the optical device operates to rotate polarization and at least partially separate the beams into three beam groups to impinge on the imaging platform as a combined beam spot, the first beam group comprising the first beam, the second beam group comprising the second and third beams having a first polarization, and the third beam group comprising the second and third beams having a second polarization, the second beam group being offset from the third beam group.

2. A projector as claimed in claim 1, wherein the optical device comprises a beam combiner, or a fold mirror, or combinations thereof.

3. A projector as claimed in claim 1, wherein the optical device comprises a beam combiner having first and second sides and having a thickness from the first side to the second side, the beam combiner having first and second sides and having a thickness from the first side to the second side, a first coating disposed on the first side of the beam combiner, the first coating being capable of imparting a first polarization rotation, and a second coating disposed on the second side of the beam combiner, the second coating being capable of imparting a second polarization rotation;
   wherein the beam combiner is capable of combining the first beam impinging on the first side and passing through the first and second coatings as a first beam component, with the second and third beams impinging on the second side to be partially reflected off the second coating as a second beam component, and partially transmitted through the second coating, the partially transmitted beams reflecting off the first coating and exiting through the second coating as a third beam component, the first second and third beam components being disposed at selected positions and having respective selected polarizations as a combined beam spot.

4. A projector as claimed in claim 1, wherein the offset and the polarization of the beam groups results in a projected image having increased allowable brightness due to an increased C6 value, or having reduced speckle, or combinations thereof.

5. A projector as claimed in claim 1, wherein the imaging platform comprises a scanning platform or a digital light projector, or combinations thereof.

6. A projector as claimed in claim 1, wherein the first polarization is orthogonal, or nearly orthogonal, to the second polarization.

7. An apparatus as claimed in claim 1, wherein the first polarization comprises P polarization and the second polarization comprises S polarization.

8. An apparatus as claimed in claim 1, wherein the first beam group has a polarization that is the same, or substantially the same as, the second polarization.

9. An apparatus as claimed in claim 1, wherein the first beam is a blue color, the second beam is a green color, and the third beam is a red color.

10. An apparatus as claimed in claim 2, wherein the offset is based at least in part on the thickness of the beam combiner or the fold mirror, or the index of refraction of the beam combiner or the fold mirror, or combinations thereof.

11. An information handling system, comprising:
    a processor and a memory coupled to the processor; and
    a projector to project an image stored in the memory on a projection surface, the projector comprising:
      first, second, and third light sources to emit beams having first, second, and third wavelengths, respectively;
      an imaging platform to control the first, second, and third beams to generate the projected image; and
      an optical device disposed between the first, second, and third light sources and the imaging platform, wherein the optical device operates to rotate polarization and at least partially separate the beams into three beam groups to impinge on the imaging platform as a combined beam spot, the first beam group comprising the first beam, the second beam group comprising the second and third beams having a first polarization, and the third beam group comprising the second and third beams having a second polarization, the second beam group being offset from the third beam group.

12. An information handling system as claimed in claim 11, wherein the optical device comprises a beam combiner, or a fold mirror, or combinations thereof.

13. An information handling system as claimed in claim 11, wherein the offset and the polarization of the beam groups results in a projected image having increased allowable brightness due to an increased C6 value, or having reduced speckle, or combinations thereof.

14. An information handling system as claimed in claim 11, wherein the imaging platform comprises a scanning platform or a digital light projector, or combinations thereof.

* * * * *